United States Patent
Bock et al.

[11] Patent Number: 5,187,983
[45] Date of Patent: Feb. 23, 1993

[54] FIBER-OPTIC STRAIN GAUGE MANOMETER

[75] Inventors: Wojtek J. Bock, Gloucester, Canada; Tomasz R. Wolinski; Roland Wisniewski, both of Warsaw, Poland

[73] Assignee: Université du Québec à Hull, Hull, Canada

[21] Appl. No.: 754,894

[22] Filed: Sep. 4, 1991

[51] Int. Cl.$^5$ .................. G01B 11/18; G01L 1/24; G01L 9/00
[52] U.S. Cl. ........................ 73/705; 73/730; 73/800; 73/862.624; 250/227.17
[58] Field of Search .................. 73/705, 800, 862.325, 73/862.624, 730; 250/227.17, 227.14, 231.19

[56] References Cited

U.S. PATENT DOCUMENTS

| | | | |
|---|---|---|---|
| 4,295,738 | 10/1981 | Meltz et al. | 356/32 |
| 4,477,725 | 10/1984 | Asawa et al. | 250/231 |
| 4,515,473 | 5/1985 | Mermelstein | 73/862.624 |
| 4,577,100 | 3/1986 | Meltz et al. | 250/231 |
| 4,612,810 | 9/1986 | Martens | 73/705 |
| 4,654,520 | 3/1987 | Griffiths | 250/227 |
| 4,701,614 | 10/1987 | Jaeger et al. | 250/227 |
| 4,750,796 | 6/1988 | Shibata et al. | 350/96.29 |
| 4,775,214 | 10/1988 | Johnson | 350/96.29 |
| 4,812,645 | 3/1989 | Griffiths | 250/227 |
| 4,899,046 | 2/1990 | Wright et al. | 250/227 |
| 4,915,473 | 4/1990 | Haese et al. | 350/96.29 |
| 4,928,004 | 5/1990 | Zimmermann et al. | 73/800 |
| 5,020,379 | 6/1991 | Berthold et al. | 73/800 |
| 5,023,845 | 6/1991 | Crane et al. | 73/800 |
| 5,132,529 | 7/1992 | Weiss | 73/800 |

OTHER PUBLICATIONS

Pomiary, Automatyka, Kontrola, (1986) No. 3, p. 60 by Roland Wisniewski.

*Primary Examiner*—Donald O. Woodiel
*Attorney, Agent, or Firm*—Foley & Lardner

[57] ABSTRACT

A fiber-optic strain gauge manometer and a method thereof are for measuring pressure of a fluid, to be respectively connected to a light source and a measurement apparatus. The manometer comprises: a cylindrical hollow body, acting as a pressure transducer, having an inlet by which the fluid can get inside, free ends such that longitudinal and circumferential strains are generated in the hollow body by the pressure of the fluid, thereby producing a dilatation of the hollow body, and a highly birefringent optical fiber having a sensing portion bonded to the outer surface of the hollow body along a longitudinal path such that its birefringence changes when the sensing portion is subjected to the dilatation of the hollow body. A polarized light beam is generated by the light source and transmitted in a form of two polarization eigenstates each parallel to one of two parallel principal birefringence axes of the birefringent optical fiber. The state of polarization of the input light beam, being strain-modulated after a passage in the sensing portion of the birefringent optical fiber is collected by the measurement apparatus for detecting and measuring change in the birefringence as a function of the dilatation, thereby giving indication of the pressure inside the hollow body. This fiber-optic strain gauge manometer can be used for measuring pressure up to at least 100 MPa.

18 Claims, 7 Drawing Sheets

FIBER-OPTIC STRAIN GAUGE MANOMETER

FIELD OF THE INVENTION

The present invention relates to a fiber-optic strain gauge manometer and a method thereof.

More precisely, the invention relates to a fiber-optic strain gauge manometer which exploits the effect of strain-induced changes in the birefringence of a strained highly birefringent optical fiber bounded to a pressure transducer based on a dilating cylindrical element.

BACKGROUND OF THE INVENTION

Pressure transducers based on strain gauges fixed to an active mechanical element that undergoes a deformation (dilation, deflection, etc.) under the influence of pressure are well known. This type of transducer is particularly well suited for measurements of elevated or high pressures inside pipelines, storage vessels or processing chambers. However, up to now, they have been all based on bonded resistance strain gauges, characterized by the gauge factor $G_F$:

$$G_F = \frac{1}{R_o} \left( \frac{dR}{d\epsilon} \right)_T \quad (1)$$

where:
$R_0$ is electrical resistance of a strain gauge; and
$\epsilon$ is longitudinal strain $\Delta l/l_0$.

The actual deformation of the element and the strain resulting from it at the location of the strain gauge will obviously depend on the design of the active element. For higher pressures up to 100 MPa this element most often takes the form of a dilating cylinder. The cylinder is usually closed at one end and has its other end directly connected to a pressure apparatus in an arrangement that may generate some unwanted stress in the active area of the cylinder.

To suppress this unwanted stress, a pressure transducer based on a dilating cylinder with free ends has been proposed by one of the inventors, Mr. Roland Wisnienski in a publication entitled "POMIARY, AUTOMATIKA, KONTROLA" (1986) No. 3, page 60, to be used with an electrical strain gauge for measuring pressure up to 100 MPa. The deformation of such a dilating cylinder is totally independent of the stress induced by connecting it to the pressure apparatus and so depends exclusively on the value of the internal pressure delivered from the external pressure apparatus.

However, electrical strain gauges, although widely used, suffer from significant temperature drift (thermally induced voltages caused by thermocoupling and temperature effects on gauge resistance and gauge factor). In addition, the low electrical output level of such a strain gauge makes it extremely susceptible to electromagnetic interference (EMI), especially in noisy industrial environments. Desensitization of these gauges to EMI is very difficult and not always possible, and the procedure is actually more costly than resistance-strain sensing technology itself.

An object of the invention is to replace the standard electrical resistance strain gauge in the strain-gauge pressure manometer based on a dilating cylindrical element by an optical fiber.

Another object of the invention is to provide a new fiber-optic strain gauge manometer and a method thereof for measuring pressure of a fluid inside a dilating cylindrical element up to 100 MPa.

Still another object of the invention is to provide a fiber-optic strain gauge manometer which is inherently immune to electromagnetic interferences, safe in electrically dangerous or explosive environments and have a significantly greater sensitivity over prior art manometers.

Still another object of the invention is to provide a method for measuring a pressure which is directly compatible with optical data transmission systems and optical multiplexing technology.

SUMMARY OF THE INVENTION

According to the present invention, there is provided a fiber-optic gauge manometer for measuring pressure of a fluid, to be respectively connected to a light source and a measurement apparatus, the manometer comprising:

a cylindrical hollow body of predetermined length and acting as a pressure transducer, the hollow body having a central axis, cylindrical inner and outer surfaces, an end, and an opposite end provided with an inlet by which the fluid can get inside the hollow body, the ends being free to move longitudinally with respect to the central axis such that longitudinal and circumferential strains are generated in the hollow body when the pressure is applied on the inner surface, thereby producing a dilation of the hollow body; and a highly birefringent optical fiber which can maintain only some polarization states, the birefringent optical fiber having a sensing portion bonded with bonding means to the outer surface of the hollow body along a longitudinal path such that birefringence of the sensing portion changes when the sensing portion is subjected to the dilation of the hollow body, the sensing portion having a length smaller than the length of the hollow body, which is selected in function of a desired sensitivity;

whereby a polarized light beam is generated by the light source and transmitted in a form of two polarization eigenstates each parallel to one of two parallel principal birefringence axes of the birefringent optical fibers, the state of polarization of the input light beam being strain-modulated after a passage in the sensing portion, the strain-modulated output light beam being collected by the measurement apparatus for detecting and measuring change in the birefringence as a function of the dilation, thereby giving indication of the pressure inside the hollow body.

According to the present invention, there is also provided a method for measuring pressure of a fluid inside a cylindrical hollow body of predetermined length and acting as a pressure transducer, the hollow body having a central axis, cylindrical inner and outer surfaces, an end, and an opposite end provided with an inlet by which the fluid can get inside the hollow body, the ends being free to move longitudinally with respect to the central axis such that longitudinal and circumferential strains are generated in the hollow body when the pressure is applied on the inner surface, thereby producing a dilatation of the hollow body, a portion of highly birefringent optical fiber which can maintain only some polarization states being bonded to the outer surface of the hollow body along a longitudinal path for subjecting the portion to the dilation, the method comprising steps of:

transmitting a polarized light beam in a form of two polarization eigenstates each parallel to one of two parallel principal birefringence axes of said birefringent optical fiber, the state of polarization of the input light beam being strain-modulated after a passage in the portion of the highly birefringent optical fiber due to change in birefringence of the birefringent optical fiber as a result of the dilation;

collecting the strain-modulated output light beam;

measuring change in the state of polarization between the input light beam and the strain-modulated output light beam; and determining a value indicative of the pressure as a function of the measured change in the state of polarization.

The present invention as well as its numerous advantages will be better understood by the following non-restrictive description of possible embodiments made in reference to the appended drawings.

DETAILED DESCRIPTION OF THE PREFERRED EMBODIMENTS

Figure 1:
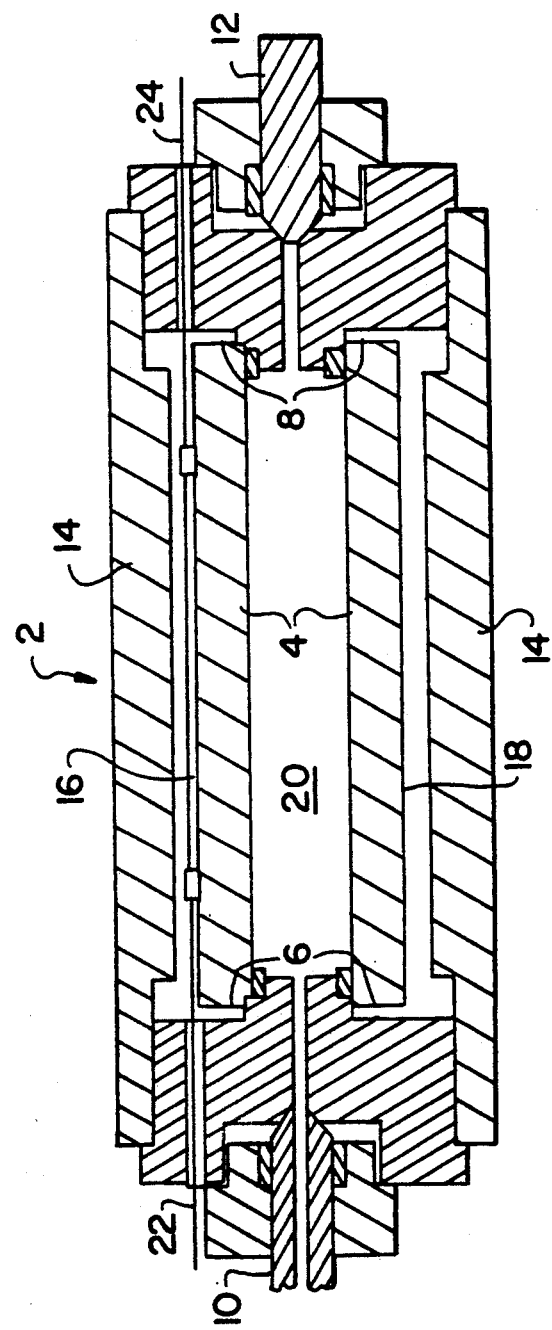
FIG. 1 is a diagram illustrating the fiber-optic strain gauge manometer according to the present invention.

In the following description and in the drawings, the same numerals refer to same elements.

Referring now to FIG. 1, the active element of the fiber-optic strain gauge manometer 2 is designed in the form of a cylindrical hollow body 4 having both its ends 6 and 8 free, thus emulating the behaviour of an infinite cylinder. The cylindrical hollow body 4 acting as a pressure transducer is built together with a pressure inlet 10, closing element 12 (which can as well be replaced with an output pressure tube) and an external protective cover 14. This concept of a free dilating cylinder pressure transducer was proposed earlier by one of the inventors, Mr. Roland Wisniewski in a publication entitled "POMIARY, AUTOMATIKA, KON-TROLA" (1986) No. 3, page 60, used with an electrical strain gauge for measuring pressure up to 100 MPa.

The deformation of the cylindrical hollow body 4 (referred hereinafter as a free dilating cylinder) depends exclusively on the value of the internal pressure delivered from outside the pressure transducer and is totally independent of the stress induced by connecting it to a pressure system. The longitudinal $\epsilon_1$ and circumferential $\epsilon_0$ strains can be found on the basis of Lame theory using the following expressions:

$$\epsilon_1 = \frac{\nu p D}{2dE} \quad (2)$$

$$\epsilon_o = \frac{pD}{2dE} \quad (3)$$

where:

E is a Young modulus, $\nu$ is the Poisson ratio, d is the thickness of the cylindrical hollow body; and D is the inside diameter of the cylindrical hollow body.

It should be noted that longitudinal strain in the case of the free dilating cylinder 4 used as an active element is negative, contrary to the case of a classical cylinder fixed at one end.

The sensing portion of a highly birefringent (referred hereinafter as HB) optical fiber 16 serving as a strain-sensitive element is epoxied to the outer wall 18 of the free dilating cylinder 4 along a longitudinal path, and thus is totally isolated from the region of high pressure 20. The axial strain to which the HB optical fiber 16 is exposed will influence the relative phase retardation $\Delta\Phi = \Phi_1 - \Phi_2$ between the two perpendicular eigenmodes guided by the fiber 16 according to the equation:

$$\frac{d\Delta\Phi}{d\epsilon} = \frac{2\pi}{\lambda}\left(\Delta n \frac{dL}{d\epsilon} + L\frac{d\Delta n}{d\epsilon}\right) \approx \frac{2\pi}{\lambda} L \frac{d\Delta n}{d\epsilon} \quad (4)$$

where:

$\lambda$ is the wavelength of the polarized light beam transmitted in the HB optical fiber 16; and $\Delta n$ is the difference between the effective indices of the two polarization eigenstates of the HB fiber 16 ($\Delta n = n_x - n_y$) defined as fiber birefringence B.

No high-pressure leadthrough is needed in this case which obviously simplifies the pressure transducer construction and avoids the uncertainties and false readings usually associated with such a leadthrough.

Before being permanently fixed to the free dilating cylinder 4, the HB optical fiber 16 is fusion-spliced with lead and collecting optical quartz fibers 22 and 24, respectively. To optimize the propagation conditions for a strain-modulated output light beam in the HB optical fiber 16 different kind of lead and collecting fibers 22 and 24 can be used. Among other kinds, here is some arrangements of particular interests:

an HB-HB-SM arrangement: a lead HB fiber 22 spliced at 45° to the HB sensing fiber 16, and a collecting single-mode fiber 24;

an HB-HB-LB arrangement: a lead HB fiber 22 spliced at 45° to the HB sensing fiber 16, and a collecting low-birefringence 24 (referred hereinafter as LB) fiber; and a LB-HB-LB arrangement: lead and collecting LB fibers 22 and 24 spliced to the HB sensing fiber 16.

One of the preferred arrangement involves a lead HB fiber 22 of same type as in the sensing HB fiber 16 but having its birefringence axes precisely aligned at 45° relative to the axes of the sensing HB fiber 16 in order to allow an incoming linearly polarized light beam to equally excite both perpendicular polarization eigenmodes inside the sensing portion. Alignment of both lead and sensing HB fibers 22 and 16 with high accuracy can be achieved with a splicing facility having an angular resolution of the rotation stage better than 0.1°. To collect the strain-modulated output light beam, a collecting LB fiber 24 which can maintain any polarization state with practically no perturbations may be used. The third mentioned arrangement (with LB fibers for both lead and collecting fibers 22 and 24) is very interesting from the practical point of view since it does not require any angularly precise splices to the sensing HB fiber 16.

Figure 2:
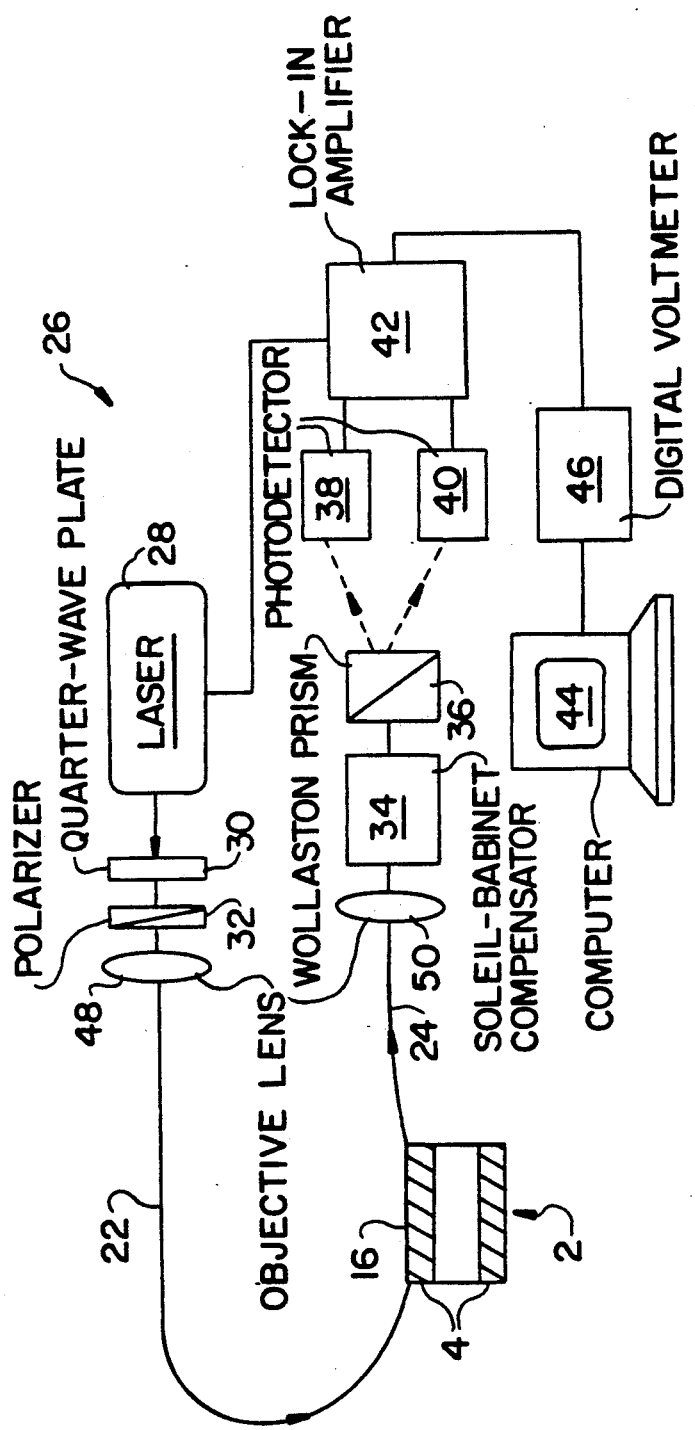
FIG. 2 is a diagram illustrating an instrumentation system for the fiber-optic strain gauge manometer in a transmission configuration.

Referring now to FIG. 2, an optical instrumentation system 26 is a transmission configuration for the manometer 2 is designed to generate a controlled polarization light beam and to collect the pressure-modulated output light beam after a passage in the sensing HB fiber 16. A linearly polarized light beam is generated by a 3 mW HeNe laser 28 acting as a light source, emitting at 633 nm and transmitted into a lead York (trademark) HB 600 optical fiber 22 with a cut-off wavelength of 550 nm, which assures a single-mode operation of the optical fibers used in the manometer 2. To precisely align the polarization plane of the polarized light beam parallel to one of its two parallel principal birefringence axes, a combination of polarization controllers is used, including a quarter-wave plate 30 and a polarizer 32. Such alignment is necessary to avoid any influence of environmental parameters on light propagation through the lead fiber 22. The strain-modulated output light beam transmitted by the collecting fiber 24 after its passage in the HB sensing fiber 16 is monitored by a measurement apparatus comprising a Soleil-Babinet compensator 34 and an appropriate analyser (as a Wollaston prism 36) combined with a two-detector system formed of two photodetectors 38 and 40 configured using a synchronous detection scheme based on a lock-in amplifier 42 in synchronism with the light source 28. If the strain-modulated output light beam (beam irradiance) is monitored using only one of these detectors 38 and 40, it can be correspondingly described by the equations:

$$I_1 = \frac{I_o}{4}(1 + \sin\Delta\Phi) \quad (5)$$

$$I_2 = \frac{I_o}{4}(1 - \sin\Delta\Phi)$$

The use of a difference-over-sum processing when both of the detectors 38 and 40 are used allows significant reduction of system fluctuations introduced by non-stable optical power $I_0$ emitted by the light source 28, according to the formula:

$$\frac{I_1 - I_2}{I_1 + I_2} = \sin\Delta\Phi \quad (6)$$

The final stage of the analog signal recovery system is a computer 44 controlled digital voltmeter 46.

Focus of the light beam at the input of the lead optical fiber 22 and at the output of the collecting fiber 24 is done with objective leans 48 and 50.

Figure 3:
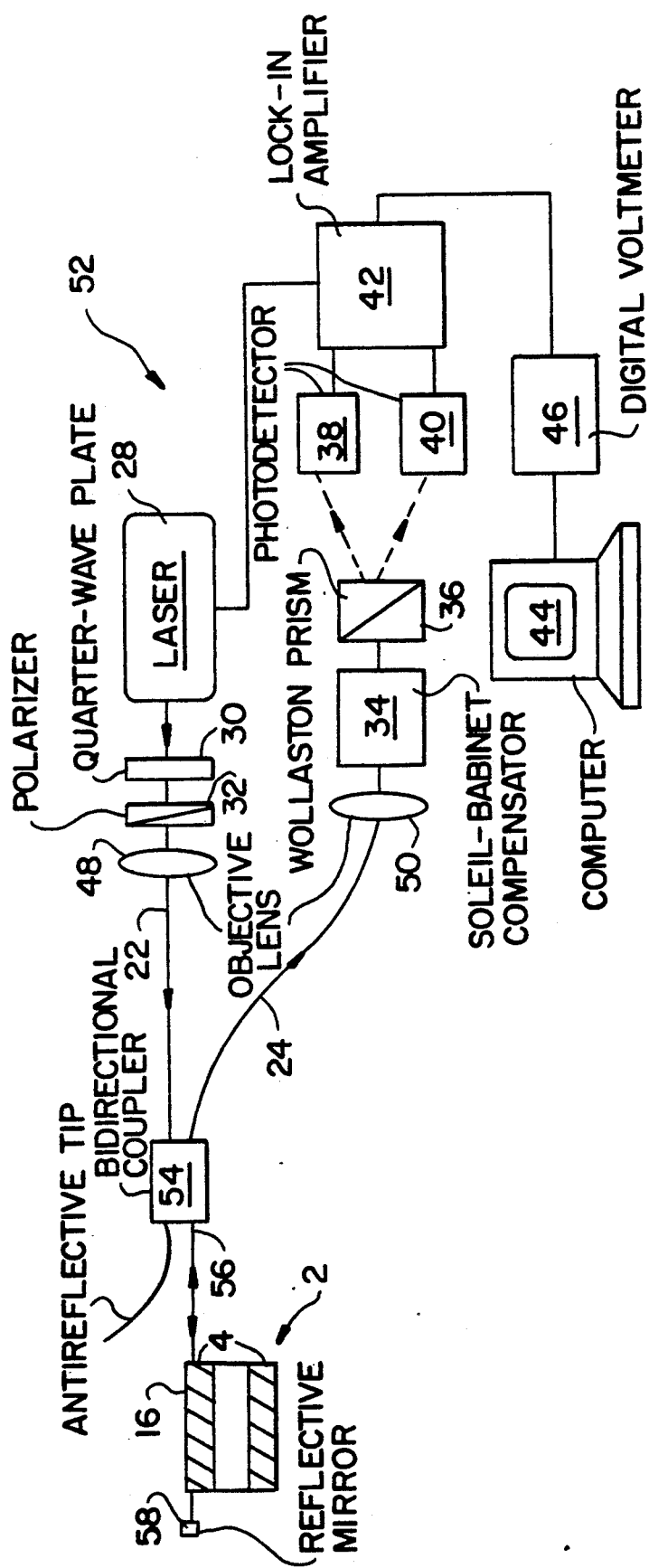
FIG. 3 is a diagram illustrating an instrumentation system for the fiber-optic strain gauge manometer in a reflection configuration.

Referring now to FIG. 3, an optical instrumentation system 52 is a reflection configuration for the manometer 2 comprises almost the same elements as the instrumentation system 26 shown in FIG. 2. The difference resides in the addition of a polarization-preserving bidirectional coupler 54 separating the input light beam and the strain-modulated output light beam which travel as two perpendicular polarization eighen modes of an interconnecting HB optical fiber 56 placed between an end of the HB sensing fiber 16 and the bidirectional coupler 54. A reflective mirror 58 is vacuum-deposited at the other end of the sensing element 16. It can be done by covering the tip of the sensing element 16 by a gold compound obtained from Engelhardt Chemicals (trademark), New Jersey, which after some heating and cooling processes makes a stable layer acting as a mirror with a reasonable reflective coefficient.

In this reflection configuration, the effective interaction distance is twice the sensing element length, resulting in sensitivity of the manometer 2 being two times greater than that of the manometer 2 in the transmission configuration as shown in FIG. 2.

Figure 4:
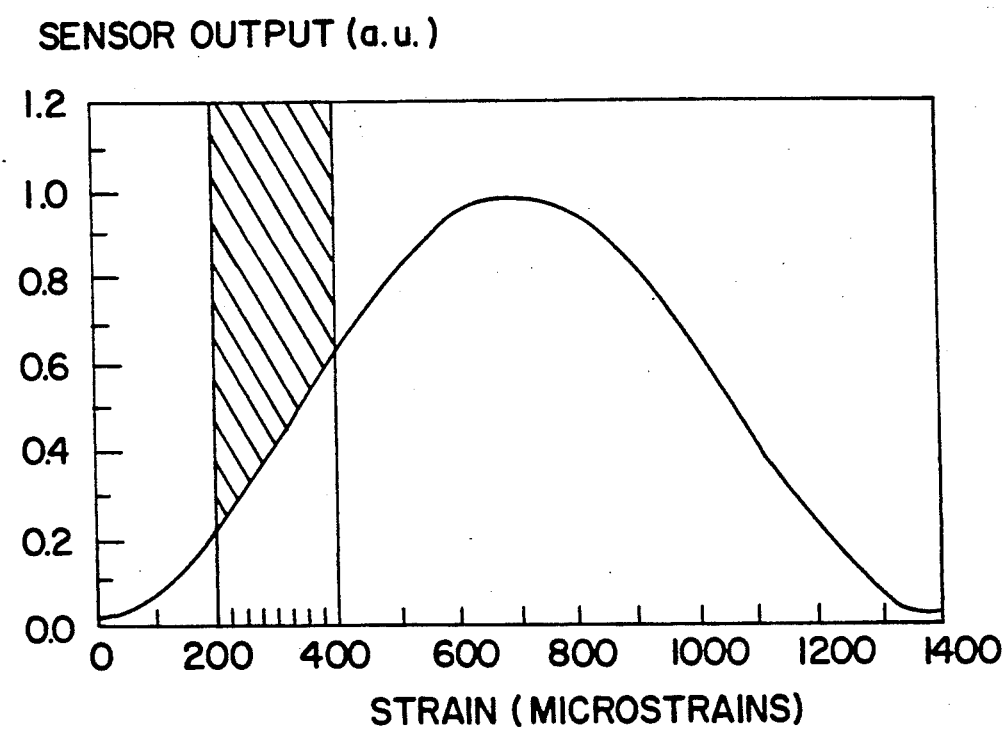
FIG. 4 is a diagram illustrating a range of operation of the fiber-optic strain gauge manometer in comparison with the full characteristic of an HB 600 fiber based strain-sensor.

Referring now to FIGS. 2 and 3, the length of the HB optical fiber 16 serving as a strain-sensitive element can obviously not exceed the length of the free dilating cylinder 4. Assuming that for a cylinder 4 having a length of about 50 mm, $E/v$ equals $2 \times 10^{-6}$ and $D/(2d)$ is about 1, and according to equation (2), the maximum value of the longitudinal strain due to the deformation caused by an internal pressure of 100 MPa can be estimated at $\epsilon_1 \sim -200\ \mu\epsilon$. If the HB sensing fiber 16 is a HB 600 York polarization-preserving bow-tie fiber having a diameter of 125 $\mu$m and a length of 40 mm (alternatively, 48 mm), the longitudinal strain required to induce a $2\pi$ phase shift in the strain-modulated light beam observed at the output of the HB sensing fiber 16 (strongly dependent on fiber's length) will amount to $T_0 \sim 1400\ \mu\epsilon$. As a measure of the periodicity of the phase shift with strain, $T_0$ will be twice diminished when the strain-modified light beam is monitored with the Wollaston prism 36 combined with the two-photodetector 38 and 40 system instead of a single analyzer/detector configuration. Additionally, the total operation range of the fiber-optic strain gauge manometer 2 (100 MPa, corresponding to 100 $\mu\epsilon$ in the strain scale) can be easily adjusted with the help of the Soleil-Babinet compensator 34 to a quasi-linear steep region of a sin-like characteristic as shown in hatched lines in FIG. 4.

Figure 8:
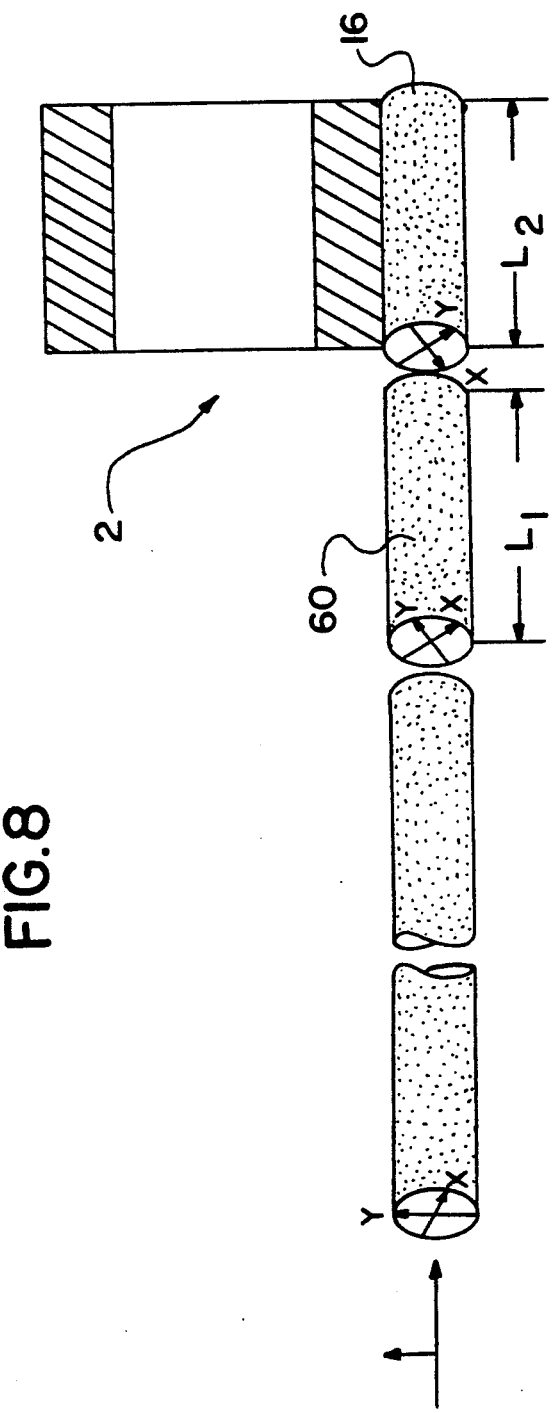
FIG. 8 is a diagram illustrating a temperature-compensated highly birefringent optical fiber in the fiber-optic strain gauge manometer.

Referring now to FIG. 8, temperature compensation of the fiber-optic strain gauge manometer 2 in both transmission or reflection configuration (shown in FIGS. 2 and 3) can be achieved with a compensation portion 60 of HB optical fiber beside the sensing portion 16. The compensated manometer 2 consists of two identical (sensing and compensating) parts of a HB polarization maintaining optical fiber, spiced at 90° in relation to their polarization axes. If both parts remain at the same temperature but only one is strained, their total temperature-induced phase retardation will cancel out. The degree of cancellation depends heavily on precise angular alignment and exact lengths of both parts of the sensor.

The phase retardation for each mode propagating in an optical fiber is given by:

$$\Phi = \frac{2\pi}{\lambda} nL \qquad (7)$$

where:
λ is the wavelength used;
n is the effective refractive index of a given mode; and
L is the length.

For a reflection configuration (as shown in FIG. 3) the effective length of the HB sensing element is twice its actual length.

The total relative phase retardation between the two perpendicularly polarized eigenmodes propagating in a HB optical fiber will be given by:

$$\Delta\Phi = \Delta\Phi(L_1) + \Delta\Phi(L_2) \qquad (8)$$

where $$\Delta\Phi(L_i) = \frac{2\pi}{\lambda} \Delta n_i N L_i$$

N is the number of sections of the HB optical fiber, e.g. N=1 for transmission configuration and N=2 for reflexion configuration; and
i is the index of the section.

Temperature-induced phase retardation can be expressed by:

$$\frac{d(\Delta\Phi)}{dT} = \qquad (9)$$

$$\frac{2N\pi}{\lambda} \sum_i \frac{d}{dT}(\Delta n_i L_i) = \frac{2N\pi}{\lambda} \sum_i \left( L \frac{d(\Delta n_i)}{dT} + \Delta n_i \frac{dL_i}{dT} \right)$$

where $n_1 = n_{xi} - n_{yi}$, and $n_{xi}$ and $n_{yi}$ are the refractive indices for two orthogonal linear polarization modes of an i-section. Since $L_1 = L_2 = L$ and both parts are rotated one fiber relative to the other by 90° about their axes, we obtain $$n_2 = -\Delta n_1 \text{ or } \Sigma \Delta n_i = 0 \qquad (10)$$

Hence $$\frac{d(\Delta\Phi)}{dT} = \frac{2N\pi}{\lambda}\left(L \sum_i \frac{d(\Delta n_i)}{dT} + \frac{dL}{dT}\sum_i \Delta n_i\right) \qquad (11)$$

Finally $$\frac{d(\Delta\Phi)}{dT} = \frac{2N\pi}{\lambda} \frac{d}{dT}\left(L \sum_i \Delta n_i\right) = 0 \qquad (12)$$

or
$\Phi(T) = $ constant

From (14) it follows that the strain sensor will be immune to ambient temperature or any other physical parameter acting on both its parts. However, if only one part of the sensor is exposed to the influence of a physical parameter the sensor will measure this parameter.

EXPERIMENTAL RESULTS

Referring again to FIG. 2, the fiber-optic strain gauge manometer 2 has been characterized at a constant temperature for pressures up to 100 MPa in the three above-mentioned arrangements involving different combinations of lead and collecting optical fibers 22 and 24 fusion-spliced at both ends of the sensing fiber 16.

Figure 5:
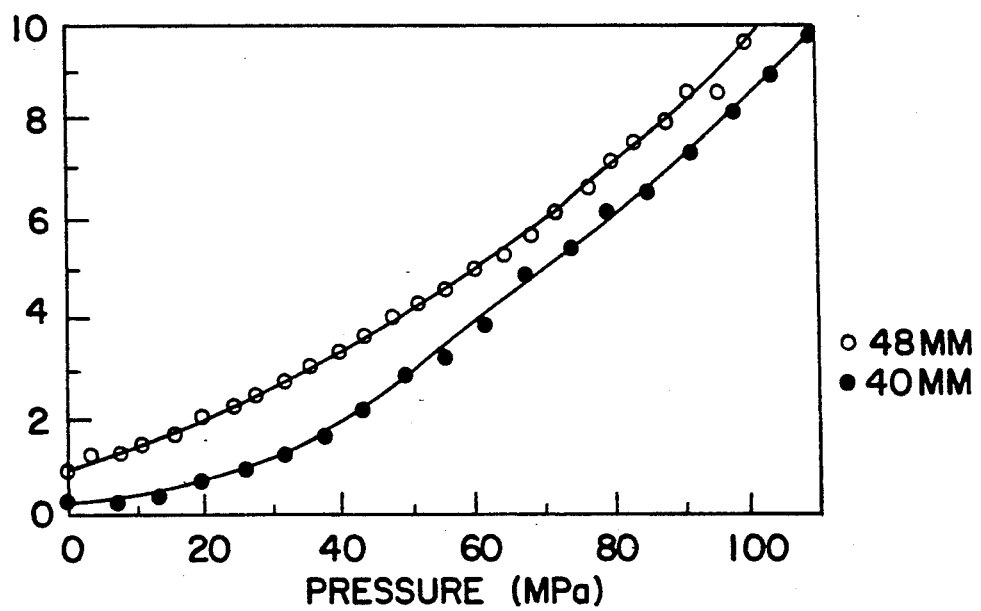
FIG. 5 is a diagram illustrating the relation between the value indicative of pressure generated by a HB-HB-LB arrangement of optical fibers for the manometer used in FIG. 2 with respect to the pressure in MPa inside the pressure transducer for two different lengths of sensing portion.

Interesting results were obtained in the second arrangement for which FIG. 5 shows pressure characteristics of two sensing elements 16 having 40 mm and 48 mm in length. However, the stable and repeatable results shown in FIG. 6 were also obtained in the third arrangement when lead and collecting optical fibers 22 and 24 were made of LB fibers. Application of LB fibers allowed for more precise control of the state of polarization in the system than would be possible using a manometer 2 equipped with a standard single mode optical fiber thus diminishing signal fluctuations while at the same time significantly decreasing the cost of the device compared to that of a sensor edquipped with a HB fiber input.

Figure 6:
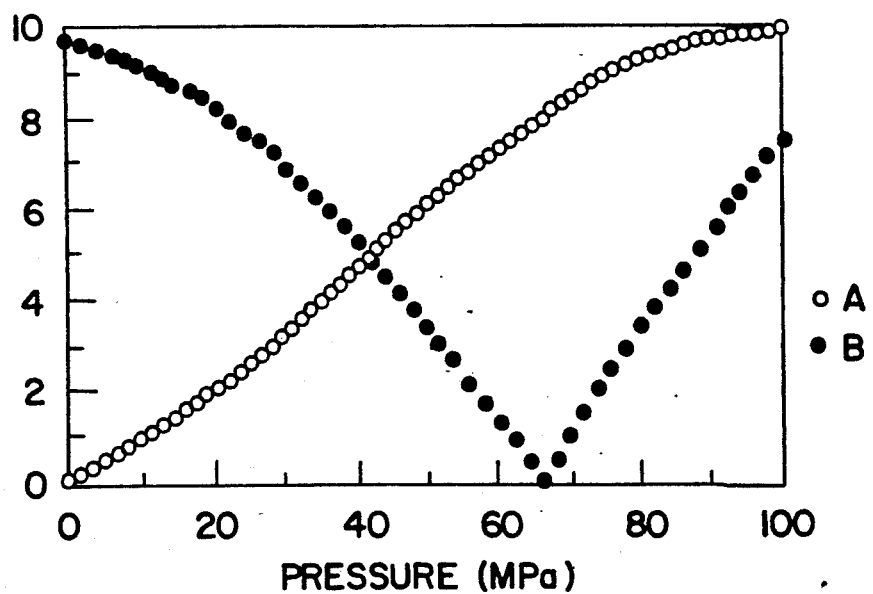
FIG. 6 is a diagram illustrating the relation between the value indicative of pressure generated by a LB-HB-LB arrangement of optical fibers for the manometer used in FIG. 2 with respect to the pressure in MPa inside the pressure transducer, with and without the Soleil-Babinet comparator.

Shown in FIG. 6 are two characteristics A and B of the same sensing element 16 (shown in FIG. 2) which were displaced using a controlled phase shift introduced by the Soleil-Babinet compensator 34 (shown in FIG. 2). The sharp minimum in the B characteristics corresponds to a strain-modulated output light beam circular polarization which is separated into both linear-polarization directions ($I_1 = I_2$) by passing through the Wollaston prism 36 (shown in FIG. 2).

Referring to FIG. 2, by combining equation (4) and the following one which results from (2):

$$\frac{d\epsilon}{dp} = -\frac{\nu D}{2dE} \qquad (13)$$

We can establish the final expression for the phase pressure sensitivity of the manometer 2. The expression (13) clearly shows how to design the manometer 2 with specified sensitivity in the predetermined pressure range:

$$\frac{d\Delta\Phi}{dp} = -\frac{\pi\nu D}{dE\lambda} L \frac{d\Delta n}{d\epsilon} \qquad (14)$$

The sensitivity can be increased simply by increasing the length of the HB sensing fiber 16 (and the length of the free dilating cylinder 4), but this might be difficult without at the same time comprising the usual requirement for miniaturisation of the sensor head. Other means, however, such as the choice of a shorter wavelength, optimal geometry (D and d parameters), and/or appropriate free dilating cylinder 4 (ν and E parameters) and fiber (Δn parameters) materials would allow sufficient flexibility in HB sensing fiber 2 design to cover most of the potential applications.

Figure 7:
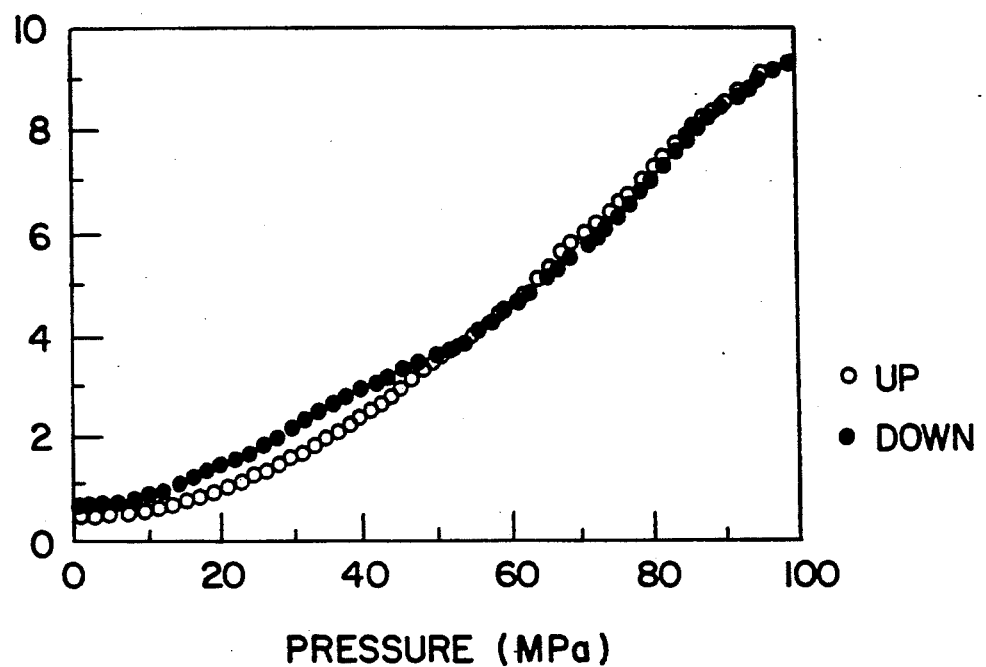
FIG. 7 is a diagram illustrating the hysteresis cycle of the fiber-optic strain gauge manometer used in FIG. 6.

FIG. 7 shows initial results of pressure cycling on the metrological properties of the fiber-optic strain gauge manometer 2 (shown in FIGS. 2 and 3). It appears that pressure-induced hysteresis of the fiber-optic strain gauge manometer 2 (shown in FIGS. 2 and 3) is residual, and generally is due to the presence of adhesives. It is well known that the mechanical properties of the optical quartz fibers themselves are excellent and do not contribute to the eventual sensor hysteresis. It has been found that the hysteresis diminished as the number of pressure cycles increased and it can be optimized through an appropriate choice of adhesive materials.

Although the present invention has been explained hereinabove by way of the preferred embodiments thereof, it should be pointed out that any modifications to these preferred embodiments, within the scope of the appended claims is not deemed to change or alter the nature and scope of the present invention.

What is claimed is:

1. A fiber-optic strain gauge manometer for measuring pressure of a fluid, to be respectively connected to a light source and a measurement apparatus, said manometer comprising:
    a cylindrical hollow body of predetermined length and acting as a pressure transducer, said hollow body having a central axis, cylindrical inner and outer surfaces, an end, and an opposite end provided with an inlet by which said fluid can get inside said hollow body, said ends being free to move longitudinally with respect to said central axis such that longitudinal and circumferential strains are generated in said hollow body when said pressure is applied on said inner surface, thereby producing a dilatation of said hollow body; and
    a highly birefringent optical fiber which can maintain only some polarization states, said birefringent optical fiber having a sensing portion bonded with bonding means to said outer surface of said hollow body along a longitudinal path such that birefringence of said sensing portion changes when said sensing portion is subjected to said dilation of the hollow body, said sensing portion having a length smaller than said length of the hollow body, which is selected in function of a desired sensitivity;
wherein a polarized light beam is generated by said light source and transmitted in a form of two polarization eigenstates each parallel to one of two parallel principal birefringence axes of said birefringent optical fiber, the state of polarization of the input light beam being strain-modulated after a passage in said sensing portion, the stain-modulated output light beam being collected by said measurement apparatus for detecting and measuring change in said birefringence as a function of said dilatation, thereby giving indication of said pressure inside said hollow body.

2. The manometer according to claim 1, wherein said hollow body can sustain pressure up to at least 100 MPa.

3. The manometer according to claim 1, wherein said means for bonding is epoxy.

4. The manometer according to claim 1, further comprising:
    a lead optical fiber spliced to an end of said birefringent optical fiber, for guiding the polarized input light beam from said light source to said sensing portion; and
    a collecting optical fiber spliced to an opposite end of said birefringent optical fiber, for guiding the strain-modulated output light beam from said sensing portion to said measurement apparatus.

5. The manometer according to claim 4, in combination with said light source and said measurement apparatus, wherein:
    said light source comprises:
        a laser for generating a polarized light beam;
        polarization controller for aligning polarization planes of said polarized light beam parallel to one of two parallel principal birefringence axes of said lead optical fiber;
    and said measurement apparatus comprises:
        a compensator for adjusting given characteristics of the strain-modulated output light beam;
        an analyzer combined with detector means for detection of the strain-modulated output light beam based on a lock-in amplifier in synchronism with said light source, and for generating an analog signal indicative of said pressure.

6. The manometer according to claim 5, further comprising:
    an objective lens between said light source and said lead optical fiber for focussing said polarized light beam into said lead fiber; and
    an objective lens between said collecting optical fiber and said measurement apparatus for focussing said strain-modulated output light beam collected by said collecting optical fiber into said compensator;
wherein said polarization controller includes a quarter-wave plate and a polarizer, said compensator is a Soleil-Babinet compensator, said analyzer is a Wollaston prism, and said detector means are two photodetectors which are controlled by said lock-in amplifier.

7. The manometer according to claim 6, wherein said birefringent optical fiber has also a compensating portion beside said sensing portion, said compensating portion having birefringence axes at 90° from the birefringence axes of said sensing portion, and a length substantially equal to said length of the sensing portion.

8. The manometer according to claim 7, wherein a passive optical fiber is added between said compensating portion and said sensing portion for ascertaining that only said birefringence of the sensing section which is subjected to said dilatation will change.

9. The manometer according to claim 6, wherein said lead optical fiber is a highly birefringent optical fiber spliced at substantially 45° to said end of the birefringent optical fiber, sand wherein said collecting optical fiber is a single mode optical fiber or a lowly birefringent optical fiber which can maintain any polarization state, connected at said opposite end of the birefringent optical fiber.

10. The manometer according to claim 6, wherein said lead optical fiber and said collecting optical fiber are lowly birefringent optical fibers which can maintain any polarization state, respectively connected to said end and said opposite end of the birefringent optical fiber.

11. The manometer according to claim 2, further comprising:
    a lead optical fiber for guiding the polarized input light beam from said light source to a bidirectional coupler;
    a collecting optical fiber for guiding the strain-modulated output light beam from said bidirectional coupler to said measurement apparatus;
    said bidirectional coupler for coupling the polarized input light beam from said lead optical fiber into an interconnecting birefringent optical fiber, and for coupling the strain-modulated output light beam from said interconnecting birefringent optical fiber into said collecting optical fiber;
    said interconnecting birefringent optical fiber having an end connected to said bidirectional coupler and an opposite end spliced at substantially 45° to an end of said birefringent optical fiber; and
    a reflective mirror at an opposite end of said birefringent optical fiber, said sensing portion being located at said opposite end.

12. The manometer according to claim 11, in combination with said light source and said measurement apparatus, wherein:
    said light source comprises:
        a laser for generating a polarized light beam;

polarization controller for aligning polarization planes of said polarizer light beam parallel to one of two principal birefringence axes of said lead optical coupler to said fiber;

and said measurement apparatus comprises:
a compensator for adjusting given characteristics of said strain-modulated output light beam;
an analyzer combined with detector means for detection of said strain-modulated output light beam based on a lock-in amplifier in synchronism with said light source, and for generating an analog signal indicative of said pressure.

13. The manometer according to claim 12, further comprising:
an objective lens between said light source and said lead optical fiber for focussing said polarized light beam into said lead fiber; and
an objective lens between said collecting optical fiber and said measurement apparatus for focussing said strain-modulated output light beam collected by said collecting optical fiber into said compensator;
wherein said polarization controller includes a quarter-wave plate and a polarizer, said compensator is a Soleil-Babinet compensator, said analyze is a Wollaston prism, and said detector means are two photodetectors which are controlled by said lock-in amplifier.

14. The manometer according to claim 13, wherein said birefringent optical fiber has also a compensating portion beside said sensing portion, said compensating portion having birefringence axes at 90° from the birefringence axes of said sensing portion, and a length substantially equal to said length of the sensing portion.

15. The manometer according to claim 14, wherein a passive optical fiber is added between said compensating portion and said sensing portion for ascertaining that only said birefringence of the sensing section which is subjected to said dilatation will change.

16. The manometer according to claim 13, wherein said lead optical fiber is a highly birefringent optical fiber, and wherein said collecting optical fiber is a single mode optical fiber or a lowly birefringent optical fiber which can maintain any polarization state.

17. The manometer according to claim 13, wherein said lead optical fiber and said collecting optical fiber are lowly birefringent optical fibers which can maintain any polarization state.

18. A method for measuring pressure of a fluid inside a cylindrical hollow body of predetermined length and acting as a pressure transducer, said hollow body having a central axis, cylindrical inner and outer surfaces, an end, and an opposite end provided with an inlet by which said fluid can get inside said hollow body, said ends being free to move longitudinally with respect to said central axis such that longitudinal and circumferential strains are generated in said hollow body when said pressure is applied on said inner surface, thereby producing a dilatation of said hollow body, a portion of highly birefringent optical fiber which can maintain only some polarization states being bonded to said outer surface of the hollow body along a longitudinal path for subjecting said portion to said dilatation, said method comprising steps of:
transmitting a polarized input light beam in a form of two polarization eigenstates each parallel to one of two parallel principal birefringence axes of said birefringent optical fiber, said input light beam being strain-modulated after a passage in said portion of the highly birefringent optical fiber due to change in birefringence of said birefringent optical fiber as a result of said dilatation;
collecting the strain-modulated output light beam;
measuring polarization change in the state of polarization between the input light beam and the strain-modulated output light beam; and
determining a value indicative of said pressure as a function of the measured change in the state of polarization.

* * * * *